April 23, 1968  N. A. FROST  3,379,458
AXIALLY ALIGNED IDENTICAL HALF FLEXIBLE HOSE
CONNECTING MEANS
Filed Feb. 1, 1967
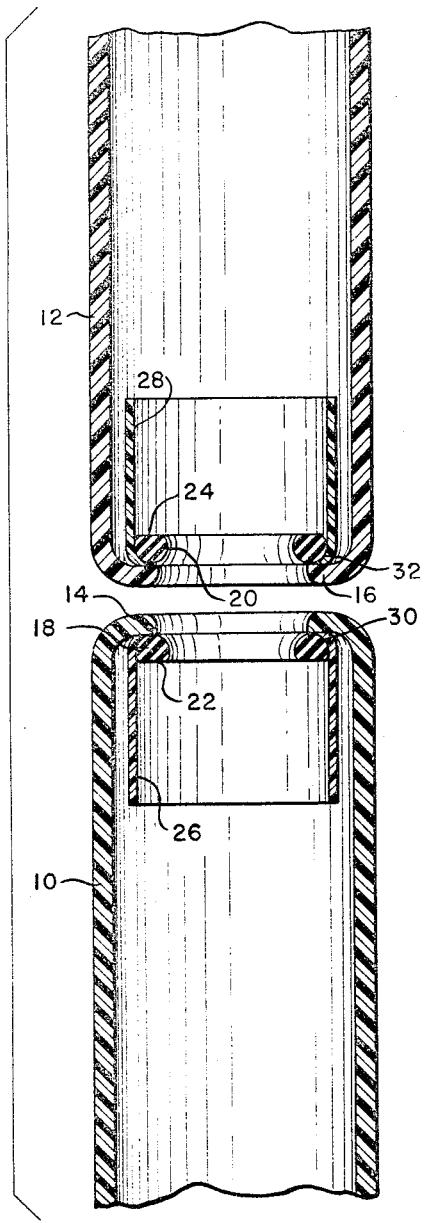
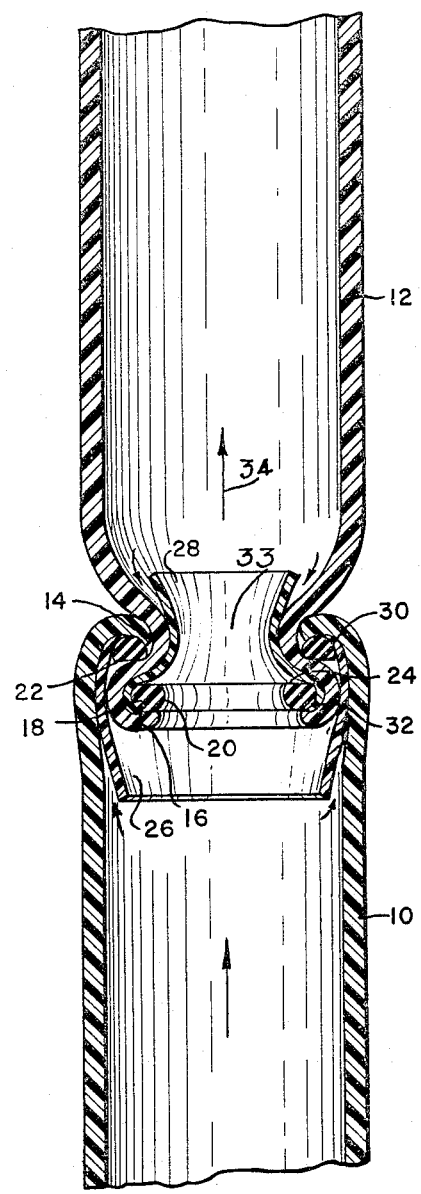
INVENTOR
NELSON A. FROST
BY
*Scrivener Parker Scrivener & Clarke*
ATTORNEYS

United States Patent Office 3,379,458
Patented Apr. 23, 1968

3,379,458
AXIALLY ALIGNED IDENTICAL HALF FLEXIBLE HOSE CONNECTING MEANS
Nelson A. Frost, 232 Mill St., Byram, Conn. 10573
Filed Feb. 1, 1967, Ser. No. 613,196
4 Claims. (Cl. 285—70)

ABSTRACT OF THE DISCLOSURE

Where the end of one flexible hose is inserted into an identical end of another to form a connecting joint, one hose is constricted by the other and there is at the joint an increase in fluid velocity and a consequent decrease in fluid pressure. Increased fluid sealing is provided at the joint by co-axial internal sleeves which conduct static pressure upstream and/or downstream of the joint back to the joint to effect pressure sealing of the inter-engaged hose ends.

DETAILED DESCRIPTION

This invention relates to axially aligned, identical half flexible hose connectors of the type wherein a hose connection is completed by the insertion of one hose end into an identically constructed second hose end.

The concept of providing a quick connecting means for hoses for fluent material wherein one hose end can be collapsed to a certain degree for insertion into a second, identically constructed hose end is generally old and such arrangements have found widespread use for conduits for fluent material, such as flour and other powdery material. However, such arrangements have not found wide-spread use where fluids, particularly liquids under relatively high pressure are to be conducted through lengths of interconnected hoses because it has been difficult to effectively pressure seal the joint due, in part, to decreased pressure at the joint resulting from the venturi effect caused by the necessary constriction of that hose member which is inserted into the other. The present invention overcomes this problem by providing auxiliary flexible, co-axial, conduit means within each of the hose ends to extend upstream and downstream of the joint and conduct back to the joint the static pressure of the liquid beyond the joint with this pressure being exerted on contiguous joint parts to effect a pressure seal at the joint.

The broad object of the invention is to provide a connector of the foregoing nature.

Other objects and their attendant advantages will become apparent as the following detailed description is read in conjunction with the accompanying drawings wherein:

FIG. 1 is a vertical cross-section view of a pair of matching hose connectors embodying the features of the present invention; and FIG. 2 is a vertical cross-sectional view of the hoses of FIG. 1 in their connected condition.

Referring now to the drawings, the numerals 10, 12 designate a pair of flexible hoses especially adapted to the conducting of liquid at relatively high pressures. As shown in FIG. 1 the ends of the respective hoses 10, 12 are provided with inwardly extending flanges 14, 16 and vulcanized to the interior faces the respective flanges are O-rings 18, 20 having flat inner faces 22, 24 as shown. Connected to the outer edges of the rings 18, 20 are sleeves 26, 28 which extend co-axially within the hoses 10, 12 away from the flanges 18, 20 and are spaced radially inwardly of the inner surfaces of the hose members as shown. Preferably the connected ends 30, 32 of the sleeves 26, 28 extend radially inwardly as shown so as to be bonded to the interior of the flanges as well as to the adjacent quadrants of the O-rings 18, 20.

When two hose sections are to be connected together, the end of either hose is partially collapsed until it can be inserted through the opening defined by the O-ring of the other hose. In the arrangement shown in FIG. 2 of the drawings, the end of the hose 12 is collapsed and also the O-ring 20 so that the hose end and the O-ring can be inserted into the opening defined by the O-ring 18 of the hose 10. After the two hoses have been thus joined, the O-ring 20 expands outwardly to the extent permitted by the hose 10 and as can be seen in FIG. 2 at the joint between the two hose sections there is a constriction 33 which creates a venturi effect for fluids flowing, say, in the direction of the arrow 34. Preferably, the downstream section of hose, in this instance, hose section 12, is inserted into the upstream section rather than the reverse so that the inner sleeve 28 of the downstream section will extend well beyond the joint into a region where the pressure of the liquid is not influenced by the venturi effect but rather is the normal back pressure which is the normal back pressure which is a function of supply pressure and hose capacity. This back pressure is directed upstream contrary to the direction of fluid flow between the outer surface of the sleeve 28 and the inner surface of the hose section 12 with a static pressure thus being exerted outwardly against the inner surface of the sleeve 12 at its point of greatest constriction against the O-ring 18 of the upstream hose section 10 to force the end of the hose section 12 downstream of its O-ring 20 into tight sealing engagement with the upstream O-ring 18.

In addition to downstream static pressure being exerted through the afforded passage by the sleeve 28, it is contemplated that under certain circumstances the upstream sleeve 26 may be forced inwardly by the pressure in the hose section 10 so that it lays against the flange 16 of the downstream hose section 12 as indicated by the phantom lines 26a. When this occurs, upstream static pressure is led into the space between the sleeve 26 and the upstream hose section 10 to urge the sleeve 26 into tight sealing engagement with the outer surface of the hose section 12 to further seal the joint against leakage.

When the hose sections are to be disconnected from each other, after the source of fluid pressure has been turned off, the parts can be collapsed and pulled apart with only slight effort.

It is believed that the foregoing description is adequate for a complete understanding of the invention and further description is unnecessary. It will be apparent to those skilled in the art that the connector of the invention is susceptible of a variety of changes and modifications, without, however, departing from the scope and spirit of the appended claims.

What is claimed is:

1. Axially aligned connector means for a hose having a co-axial end opening, a flexible O-ring bonded to the inner end of said hose adjacent said opening, and a flexible sleeve bonded at one end to said O-ring and extending co-axially and freely within said hose in a direction away from said opening.

2. The connector means of claim 1 including a second hose having a co-axial end opening, O-ring and sleeve substantially identical to the first hose, the end of one of said hoses being received within the end of the other with the O-ring of the first hose being positioned in the second hose behind the O-ring thereof on the side away from said opening.

3. The connector means of claim 2 wherein each of said sleeves has a length wherein the inner free ends of said sleeves extend a substantial distance into said hoses beyond the joint therebetween.

4. The connector means of claim 1 wherein the hose end is provided with an inwardly extending flange, the outer diameter of said O-ring being less than the inner diameter of said hose, said O-ring being bonded to said flange, said sleeve having less diameter than the inner diameter of said hose so as to be normally spaced therefrom.

References Cited

UNITED STATES PATENTS

| | | | |
|---|---|---|---|
| 1,773,643 | 8/1930 | Romanchak | 285—8 X |
| 2,063,967 | 12/1936 | Whittam | 285—344 X |
| 2,984,503 | 5/1961 | Cunningham | 285—260 |
| 3,103,016 | 9/1963 | Perlman | 285—260 X |
| 3,114,567 | 12/1963 | Colley | 285—330 X |

FOREIGN PATENTS 358,590  9/1922  Germany.

EDWARD C. ALLEN, *Primary Examiner.*

CARL W. TOMLIN, *Examiner.*

R. G. BERKLEY, *Assistant Examiner.*